(12) United States Patent
Schellekens et al.

(10) Patent No.: US 9,255,211 B2
(45) Date of Patent: Feb. 9, 2016

(54) ADHESION TO PLASTIC WITH BLOCK COPOLYMERS OBTAINED USING RAFT

(71) Applicant: DSM IP ASSETS B.V., Heerlen (NL)

(72) Inventors: Michael Arnoldus Jacobus Schellekens, Waalwijk (NL); Gerardus Cornelis Overbeek, Waalwijk (NL); Tijs Nabuurs, Waalwijk (NL); John Geurts, Waalwijk (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/046,805

(22) Filed: Oct. 4, 2013

(65) Prior Publication Data

US 2014/0037975 A1    Feb. 6, 2014

Related U.S. Application Data

(63) Continuation of application No. 13/439,278, filed on Apr. 4, 2012, now abandoned, which is a continuation of application No. 12/935,991, filed as application No. PCT/EP2009/053891 on Apr. 1, 2009, now abandoned.

(30) Foreign Application Priority Data

Apr. 1, 2008 (EP) .................... 08103288

(51) Int. Cl.
- *C08F 2/24* (2006.01)
- *C08F 293/00* (2006.01)
- *C08L 53/00* (2006.01)
- *C09D 153/00* (2006.01)

(52) U.S. Cl.
CPC ............... *C09D 153/00* (2013.01); *C08F 2/24* (2013.01); *C08F 293/005* (2013.01); *C08L 53/00* (2013.01); *C08L 53/005* (2013.01); *Y10T 428/31935* (2015.04); *Y10T 428/31938* (2015.04)

(58) Field of Classification Search
CPC ...... C09D 153/00; C08F 2/24; C08F 293/005
USPC .............................. 525/88; 524/462
See application file for complete search history.

(56) References Cited

U.S. PATENT DOCUMENTS

| | | | |
|---|---|---|---|
| 6,187,854 B1 * | 2/2001 | Spinelli et al. ................ | 524/505 |
| 6,437,040 B2 | 8/2002 | Anthony et al. | |
| 6,503,975 B1 | 1/2003 | Huybrechts | |
| 6,825,290 B2 * | 11/2004 | Adam et al. ................ | 526/75 |
| 2003/0114548 A1 | 6/2003 | Bett et al. | |
| 2004/0071871 A1 | 4/2004 | Queval et al. | |
| 2004/0082494 A1 | 4/2004 | Queval et al. | |

FOREIGN PATENT DOCUMENTS

| | | | |
|---|---|---|---|
| JP | 02307749 | | 12/1990 |
| JP | 02307749 A | * | 12/1990 |
| WO | 02/090392 | | 11/2002 |
| WO | 03/068827 | | 8/2003 |
| WO | 2006/037161 | | 4/2006 |

* cited by examiner

*Primary Examiner* — Kelechi Egwim
(74) *Attorney, Agent, or Firm* — Nixon & Vanderhye P.C.

(57) ABSTRACT

An aqueous coating composition (which optionally can coat plastic substrates) the composition comprising a block copolymer and a polymer P; where the block copolymer comprises at least blocks $[A]_x[B]_y$; where at least block [A] is obtained by a controlled radical polymerization of at least one ethylenically unsaturated monomer via a reversible addition-fragmentation chain transfer (RAFT) mechanism (optionally in solution in the presence of a control agent and a source of free radicals); and wherein block [A] comprises 20 to 100 mol % of ethylenically unsaturated monomer units bearing water-dispersing functional groups; wherein block [B] comprises 20 to 100 mol % of ethylenically unsaturated monomer units bearing plastic adhesion promoting functional groups; and wherein polymer P is prepared in the presence of blocks $[A]_x[B]_y$. The compositions may be used to coat plastic substrates, foam; surfaces having low surface energy, hydrophobic substrates and/or polyolefins.

11 Claims, No Drawings

ADHESION TO PLASTIC WITH BLOCK COPOLYMERS OBTAINED USING RAFT

This application is a continuation of commonly owned U.S. application Ser. No. 13/439,278 filed Apr. 4, 2013 (now abandoned), which is a continuation of U.S. application Ser. No. 12/935,991 filed on Dec. 20, 2010 (now abandoned), which is the U.S. national phase of International Application No. PCT/EP2009/053891, filed Apr. 1, 2009, which designated the U.S. and claims priority to European Application No. 08103288.0, filed Apr. 1, 2008, the entire contents of each of which are hereby incorporated by reference.

This invention relates to a process for obtaining an aqueous coating composition comprising a block copolymer and polymer where the composition is preferably suitable for application to a plastic substrate more preferably a hydrophobic plastic substrate.

It is well recognised that adhesion to plastic substrates and in particular hydrophobic plastic substrates is generally hard to achieve. For adhesion to polyolefins, especially to polyolefins such as polypropylene, a hydrophobic polymer would be desirable. A problem with the sole use of such hydrophobic polymers is that they tend to lack other properties, like good mechanical properties such as flexibility and furthermore they may be difficult to pigment. Pigment wetting often requires the presence of hydrophilic groups which will be less favourable for wetting of hydrophobic substrates.

Coatings for plastic substrates need to take into account the low surface energy of plastic parts and the chemical similarity between the coating materials and the plastic substrate. Coatings for plastic substrates must adhere well to the plastic part for the life of the component and the following criteria are often used to measure the performance: adhesion, chemical resistance, impact performance and scratch resistance.

The adhesion of the coating to the plastic substrate is mainly determined by surface tension characteristics of the coating and the substrate and interdiffusion of the coating into the substrate.

Surface tension will directly influence a coating's ability to wet out, to penetrate, and to adhere to the porous structure of a surface. It is generally seen that the lower the surface tension, the more problematic it is to get good adhesion of the coating on the substrate.

The surface tension of the coating should be lower than the surface tension of the substrate to enable wetting of the coating on the surface of the substrate. Efficient wetting will maximize the adhesion. Surface roughness may also be an important parameter in certain cases as "mechanical interlocking" is another way to improve adhesion.

Interdiffusion is the main adhesion mechanism for amorphous plastics, especially in the case of solvent based coating systems. The solvent is used to diffuse the polymer in the coating into the plastic substrate to provide for molecular interlocking. Ideally, this solvent should be selected from those that are good solvents for the polymers of the coating composition, and for the polymer constituting that of the plastic substrate.

From an environmental point of view there is however an increasing need to reduce the amount of organic solvents in such coating compositions. In this respect waterborne binders are clearly preferred over conventional solventborne binders. The use of waterborne binders in coating compositions for application to hydrophobic plastic substrates may however give issues regarding wetting and or polymer interdiffusion.

A common method to enhance the coating adhesion to hydrophobic plastics with a relatively low surface tension like polyolefins and fluorocarbons is to employ surface pretreating processes. Surface treatments include chemical and physical methods such as chemical etching and corona discharge, and typically result in the formation of polar groups on the surface such as pendant hydroxyl, chloro, amino and carboxyl groups. The introduction of polar groups on the plastic substrate surface can provide improved wetting (as the surface tension is increased) and potential chemical interaction with the applied coating composition, which can result in improved adhesion. Such surface pretreating methods however are often costly and time-consuming, and tend to negatively affect the plastic surface physical properties.

Clearly a need exists for water-based binders that provide the desired combination of good adhesion to (hydrophobic) plastic substrates and good mechanical properties and chemical or stain resistances.

There is an increased scope of polymerisation methods available for adaptation to polymerisations to make waterborne polymers. In the design of such waterborne polymers for plastic coating applications it would be very advantageous to be able to control the polymer binder composition in terms of polymer chain composition and chain architecture. For example, for obtaining good adhesion to hydrophobic plastics it is desirable to use hydrophobic polymers that are preferably of the same chemical composition as the plastic polymer chains to maximise the degree of polymer chain interdiffusion. For waterborne polymers however the degree of chain interdiffusion is limited by the significant amount of hydrophilic comonomers that typically need to be incorporated randomly in the hydrophobic polymer backbone to make the polymer water-dispersable. In addition, crosslinking of the binder composition can provide improved coating performance in terms of for example chemical resistances, but will often have a negative effect on adhesion. It would therefore be desirable to separate out water-dispersing and or crosslinking functionality from adhesive functionality within the polymer binder.

In particular controlled radical polymerisation techniques such as nitroxide mediated polymerisation (NMP), atom transfer radical polymerisation (ATRP), and degenerative transfer techniques such as reversible addition-fragmentation chain transfer (RAFT) polymerisation have been investigated as means to control polymer chain composition and architecture.

EP020125, EP381029, EP381030, EP468644, EP517379 and EP560508 disclose monomers suitable for use in polymers to give improved adhesion of the polymers to plastic substrates. However, none of prior art examples discloses the advantageous use of an adhesion promoting block copolymer that provides the desired adhesion of the coating composition to plastic substrates.

US2004/0071871 (and US2004/0082494) discloses the use of an amphiphilic block copolymer prepared using RAFT polymerization as an additive for film forming compositions to promote adhesion on a low energy surface such as a plastic or thermoplastic polymer surface. The amphiphilic block copolymer provides improved wetting of the film forming binder composition, but does not provide (significant) improved adhesion of the binder composition to (hydrophobic) plastic substrates.

US2002/0198347 describes a surface active block copolymer comprising at least one hydrophilic block and at least one hydrophobic block, prepared by living radical polymerisation. The $M_n$ of the block copolymer is between 1,000 and 50,000 D, the Tg of the hydrophobic block between −100 and +30° C. and having a specific surface tension. US2002/0198347 does not teach the advantageous use of a block copolymer-binder composition for obtaining the desired combination of good adhesion to hydrophobic plastic substrates and good mechanical properties and good chemical or stain resistances. Furthermore, the block copolymers as disclosed in the prior art may provide adhesion to plastic substrates through improved wetting of the coatings, however, the overall level of adhesion is limited as the block copolymers do not provide improved interdiffusion between the plastic substrate and the coating composition.

WO 02/090392 discloses an acrylic acid (AA)/butyl acrylate (BA) block copolymer. Although the copolymer contains the hydrophobic monomer BA it is not present in an amount which could be considered to aid adhesion to plastic.

EP560508 discloses a coating composition for polyolefins including polypropylene comprising an aqueous emulsion of a polymer system comprising a polymer which imparts polyolefin adherability.

WO08/00622 relates to a method for coating substrates of polyolefins by treatment with an aqueous dispersion containing a copolymer, a copolymer of a $C_{3-10}$ olefin and at least one amphiphilic block copolymer.

We have now surprisingly found that according to the present invention the reversible addition-fragmentation chain transfer (RAFT) polymerisation process provides a useful route for preparing a waterborne polymer composition that provides improved adhesion to plastic substrates and in particular hydrophobic plastic substrates in combination with good general coating properties, such as good mechanical properties, pigment wetting and chemical resistances. This advantageous combination of properties may be achieved with block copolymers comprising one block having a specific concentration of plastic adhesion promoting monomers and one block having a hydrophilic character. Furthermore the reversible addition-fragmentation chain transfer (RAFT) polymerisation process may be used to provide a useful route for making water-based (or water-dispersable) block copolymers that contain a plastic adhesion promoting block next to at least a hydrophilic block.

When a suitable polymer is prepared in the presence of such a block copolymer it means that waterborne coatings with an advantageous combination of coating properties can be obtained that is difficult to achieve otherwise.

RAFT polymerisation in for example a solution can avoid the undesirable homopolymerisation of monomers with a high water solubility and provides the possibility to fully control the polymer chain composition and the chain architecture of water-based polymers. By making an [A][B] type of block copolymer, followed by preparing a polymer P, the above problems may be mediated, and waterborne polymer compositions can be obtained that have the desired combination of properties such as good film formation, good mechanical properties, chemical coating properties and/or good adhesion to plastic substrates (for example hydrophobic plastic substrate).

An aspect of the present invention relates to aqueous compositions that are capable of being applied to a plastic substrate to form a coating thereon and a process for obtaining such compositions (which are also referred to herein as aqueous plastic coating compositions).

It is an object of the present invention to address some or all of the problems described herein.

According to the invention there is provided a process for preparing a aqueous coating composition comprising a block copolymer and a polymer P; wherein the block copolymer comprises at least blocks $[A]_x[B]_y$, where at least block [A] is obtained by a controlled radical polymerisation of at least one ethylenically unsaturated monomer via a reversible addition-fragmentation chain transfer (RAFT) mechanism; where block [A] comprises:
i) 0 to 50 mol % of ethylenically unsaturated monomer units bearing crosslinking functional groups;
ii) 20 to 100 mol % of ethylenically unsaturated monomer units bearing water-dispersing functional groups;
iii) 0 to 50 mol % of ethylenically unsaturated monomers units selected from linear or branched $C_1$ to $C_8$ alkyl (meth)acrylate monomers;
iv) 0 to 5 mol % of ethylenically unsaturated monomer units bearing plastic adhesion promoting functional groups; and
v) 0 to 10 mol % of ethylenically unsaturated monomers units different from those from i), ii), iii)+iv);
where i), ii), iii), iv)+v) add up to 100%;
block [A] has an average degree of polymerisation x, where x is an integer from 3 to 80;
where block [B] comprises:
i) 0 to 5 mol % of ethylenically unsaturated monomer units bearing crosslinking functional groups;
ii) 0 to 15 mol % of ethylenically unsaturated monomer units bearing water-dispersing functional groups;
iii) 0 to 50 mol % of ethylenically unsaturated monomers units selected from linear or branched $C_1$ to $C_8$ alkyl (meth)acrylate monomers;
iv) 20 to 100 mol % of ethylenically unsaturated monomer units bearing plastic adhesion promoting functional groups; and
v) 0 to 10 mol % of ethylenically unsaturated monomers units different from those from i), ii), iii)+iv);
where i), ii), iii), iv)+v) add up to 100%;
block [B] has an average degree of polymerisation y, where y is an integer $\geq 10$, where y>x; and
where polymer P is obtained in the presence of the block copolymer by an emulsion polymerisation process, and comprises:
i) 0 to 20 wt % of ethylenically unsaturated monomer units bearing crosslinking functional groups;
ii) 0 to 15 wt % of ethylenically unsaturated monomer units bearing water-dispersing functional groups;
iii) 50 to 100 wt % of ethylenically unsaturated monomers units selected from linear or branched $C_1$ to $C_8$ alkyl (meth)acrylate monomers;
iv) 0 to 50 wt % of ethylenically unsaturated monomer units bearing plastic adhesion promoting functional groups; and
v) 0 to 10 mol % of ethylenically unsaturated monomers units different from those from i), ii), iii)+iv);
where i), ii), iii), iv)+v) add up to 100%.

Preferably block [A] is obtained and/or obtainable by a controlled radical polymerisation of at least one ethylenically unsaturated monomer via a reversible addition-fragmentation chain transfer mechanism in solution in the presence of a control agent and a source of free radicals.

It is preferred that the compositions of the invention are coating compositions capable of being applied to plastic substrates to from a coating thereon.

The average degree of polymerisation x (or y) is determined by the total molar amount of monomers in block [A] (or [B]) divided by the total molar amount of control (RAFT) agent.

Preferably integer x is in the range of from 4 to 70 and more preferably 5 to 60.

Preferably integer y is the range of from 10 to 500, more preferably 20 to 300 and most preferably 25 to 200.

Preferably the block copolymer obtained by the process of the invention comprises in the range of from 2 to 50 wt %, more preferably 4 to 40 wt % and especially 5 to 35 wt % of block [A] based on the weight of blocks [A] and [B].

Preferably the composition obtained by the process of the invention comprises in the range of from 0.5 to 65 wt %, more preferably 2 to 50 wt % and most preferably 3 to 40 wt % of blocks [A][B] together, based on the weight of blocks [A][B] and polymer P.

The term "comprising" as used herein means that the list that immediately follows is non exhaustive and may or may not include any other additional suitable items, for example one or more further feature(s), component(s), ingredient(s) and/or substituent(s) as appropriate. "Substantially comprising" as used herein means a component or list of component(s) is present in a given material in an amount greater than or equal to about 90%, preferably ≥95%, more preferably ≥98% by weight of the total amount of the given material. The term "consisting of" as used herein mean that the list that follows is exhaustive and does not include additional items.

For all upper and lower boundaries of any parameters given herein, the boundary value is included in each range for each parameter. All combinations of minimum and maximum values of the parameters described herein may be used to define the parameter ranges for various embodiments and preferences of the invention.

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non-exhaustive the sum of the percentage for each of such components may be less than 100% to allow a certain percentage for additional amount(s) of any additional component(s) that may not be explicitly described herein.

Unless the context clearly indicates otherwise, as used herein plural forms of the terms herein (for example monomer, polymer, control agent, initiator and/or block) are to be construed as including the singular form and vice versa.

As used herein chemical terms (other than IUPAC names for specifically identified compounds) which comprise features which are given in parentheses—such as (alkyl)acrylate, (meth)acrylate and/or (co)polymer—denote that that part in parentheses is optional as the context dictates, so for example the term (meth)acrylate denotes both methacrylate and acrylate.

The substituents on the repeating unit of the polymer and/or block copolymer may be selected to improve the compatibility of the materials with the polymers and/or resins in which they may be formulated and/or incorporated for the uses described herein. Thus the size and length of the substituents may be selected to optimise the physical entanglement or interlocation with the resin or they may or may not comprise other reactive entities capable of chemically reacting and/or crosslinking with such other resins as appropriate.

A block copolymer is understood to be a copolymer comprising at least two successive sections of blocks of monomer units of different chemical constitutions. The block copolymers of the invention can therefore be diblock, triblock or multiblock copolymers. Block copolymers may be linear, branched, star or comb like, and have structures such as [A][B], [A][B][A], [A][B][C], [A][B][A][B], [A][B][C][B] etc. Preferably the block copolymer is a linear diblock copolymer of structure [A][B], or a linear triblock copolymer of structure [A][B][A]. Block copolymers may have multiple blocks [A], [B] and optionally [C] in which case the block copolymer is represented as for example $[A]_x[B]_y$ or $[A]_x[B]_y[C]_z$, where x, y and z are the degrees of polymerisation (DP) of the corresponding blocks [A], [B] or [C].

Furthermore any of the blocks in the block copolymer could be either a homopolymer, meaning only one type of monomer, or a copolymer, meaning more than one type of monomer. In case of a copolymer type of block the composition could be either random or gradient like, depending on the processing conditions used. A block with a gradient composition is understood to be a block having a continuously changing monomer composition along the block.

The block copolymer may be oligomeric comprising only a few repeat units (such as up to 10) where typically any change in the number of repeat units may significantly effect the overall properties of the oligomer. Alternatively the block copolymer may be a polymer with many more repeat units in which typically a small change in the number of repeat units in the polymer has little or no effect on the polymer's properties.

The term "controlled radical polymerisation" is to be understood as a specific radical polymerisation process, also denoted by the term of "living radical polymerisation", in which use is made of control agents, such that the block copolymer chains being formed are functionalised by end groups capable of being reactivated in the form of free radicals by virtue of reversible transfer or reversible termination reactions.

Controlled radical polymerisation processes in which reversible deactivation of radicals proceeds by reversible transfer reactions include for example the process for radical polymerisation controlled by control agents, such as reversible transfer agents of the dithioester (R—S—C(=S)—R') type as described in WO98/01478 and WO99/35178, the process for radical polymerisation controlled by reversible transfer agents of trithiocarbonate (R—S—C(=S)—S—R') type as described in for example WO98/58974, the process for radical polymerisation controlled by reversible transfer agents of xanthate (R—S—C(=S)—OR') type as described in WO98/58974, WO00/75207 and WO01/42312, and the process for radical polymerisation controlled by reversible transfer agents of dithiocarbamate (R—S—C(=S)—$NR_1R_2$) type as described for example in WO99/31144 and WO99/35177.

Such controlled radical polymerisations are known in the art as reversible addition-fragmentation chain transfer (RAFT) polymerisation (WO98/01478; Macromolecules 1998 31, 5559-5562) or macromolecular design via interchange of xanthates (MADIX) polymerisation (WO98/58974; Macromolecular Symposia 2000 150, 23-32).

"Addition-fragmentation" is a two-step chain transfer mechanism wherein a radical addition is followed by fragmentation to generate a new radical species.

When preparing for example a block copolymer in the presence of the control agent, the end of the growing block is provided with a specific functionality that controls the growth of the block by means of reversible free radical deactivation. The functionality at the end of the block is of such a nature that it can reactivate the growth of the block in a second and/or third stage of the polymerisation process with other ethylenically unsaturated monomers providing a covalent bond between for example a first and second block [A] and [B] and with any further optional blocks.

Optionally the chain end functionality of block copolymer $[A]_x[B]_y$ is retained to assist with the covalent bond formation between block copolymer $[A]_x[B]_y$ and any further optional blocks and or polymer P.

Preferably the block copolymer is obtained from a controlled radical polymerisation process employing as a control agent, a reversible transfer agent. Reversible transfer agents may be one or more compounds selected from the group consisting of dithioesters, thioethers-thiones, trithiocarbonates, dithiocarbamates, xanthates and mixtures thereof.

Reversible transfer agents also include symmetrical transfer agents. An example is a dibenzyltrithiocarbonate such as. $C_6H_5CH_2$—S—C(=S)—S—$CH_2C_6H_5$.

Control agents of the xanthate type have low transfer constants in the polymerization of styrenes and in particular methacrylate type monomers which may result in a higher polydispersity and/or poor chain growth control of the resultant polymers and may be considered as less effective RAFT control agents, although the actual mechanism involved is similar to the reversible-addition fragmentation chain transfer (RAFT) mechanism described in WO98/01478. Reversible transfer agents of the dithioester type like for example benzyl dithiobenzoate derivatives are generally considered as having a high transfer constant and being more effective RAFT control agents.

Transfer constants are described in WO98/01478. "Chain transfer constant" ($C_{tr}$) means the ratio of the rate constant for chain transfer ($k_{tr}$) to the rate constant for propagation ($k_p$) at zero conversion of monomer and CTA. If chain transfer occurs by addition-fragmentation, the rate constant for chain transfer ($k_{tr}$) is defined as follows:

$$k_{tr} = k_{add} \times [k_\beta / (k_{-add} k_\beta)]$$

where $k_{add}$ is the rate constant for addition to the CTA and $k_{-add}$ and $k_\beta$ are the rate constants for fragmentation in reverse and forward directions respectively.

In an embodiment of the invention the control agent preferably has a transfer constant $C_{tr} = (k_{add}/k_\beta)[k_\beta/(k_{-add}+k_\beta)]$ of less than 50, more preferably less than 20 and most preferably below 10.

Preferably the block copolymer is obtained from a controlled radical polymerisation process employing a control agent having a group with formula

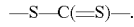

Preferably the block copolymer is obtained from a controlled radical polymerisation process employing xanthates and/or dibenzyltrithiocarbonate.

Preferably the block copolymer is obtained from a controlled radical polymerisation process employing a xanthate such as O-ethyl-S-(1-methoxycarbonyl) ethyl dithiocarbonate [RSC(=S)—$OC_2H_5$ where R=CH($CH_3$)—C(=O)—$OCH_3$].

For clarity, control agents for use in RAFT do not include diphenylethylene, which although it is a control agent can not be used as a RAFT control agent, i.e. for a RAFT polymerisation mechanism.

Component I)

Conveniently component i) may comprise ethylenically unsaturated monomer units (usually $C_{1-12}$alkyl(meth)acrylates) bearing crosslinking functional groups such as reactive double bonds [for example allyl(meth)acrylate], epoxy [for example glycidyl(meth)acrylate], hydroxy [for example hydroxyalkyl(meth)acrylates such as hydroxyethyl(meth) acrylate, 2-hydroxypropyl(meth)acrylate, 4-hydroxybutyl (meth)acrylate and their modified analogues like Tone M-100 (available commercially from Union Carbide Corporation under this trade name)], anhydride (for example maleic anhydride), amine [for example dimethylaminoethyl(meth)acrylate], acetoacetoxy [such as acetoacetoxyethyl(meth)acrylate, for example for crosslinking with amines], keto or aldehyde [such as (meth)acrolein or diacetone acrylamide, for example for crosslinking with additive crosslinkers including dihydrazides (such as adipic acid dihydrazide) or silane functional groups], combinations thereof on the same monomer and/or mixtures thereof. Preferred monomers suitable for crosslinking include for example hydroxyalkyl (meth)acrylates, glycidyl(meth)acrylates and diacetone acrylamide.

Monomers which may also provide some water-dispersing properties, such as hydroxyalkyl(meth)acrylates like for example hydroxyethyl(meth)acrylate (HE(M)A), are considered herein as ethylenically unsaturated monomers providing crosslinking functional groups.

Preferably block [A] comprises 0 to 35 mol %, more preferably 0 to 25 mol % and most preferably 2 to 25 mol % of component i).

Preferably block [B] comprises 0 to 3 mol %, more preferably 0 mol % of component i).

Preferably polymer P comprises 0 to 15 wt % of component i).

Component II)

Conveniently component ii) may comprise ethylenically unsaturated monomer units (preferably having at least 3 carbon atoms e.g. from 3 to 20 carbon atoms) bearing non-ionic, ionic or potentially ionic water-dispersing functional groups. Preferably the water-dispersing functional groups bearing ionic or potentially ionic functional groups need to be in their dissociated (i.e. salt) form to effect their water-dispersing action. If they are not dissociated they are considered as potential ionic groups which become ionic upon dissociation. The ionic water-dispersing groups are preferably fully or partially in the form of a salt in the final composition of the invention. Ionic or potentially ionic water-dispersing groups include cationic water-dispersing groups such as basic amine groups, quaternary ammonium groups, and anionic water-dispersing groups such as acid groups, for example phosphoric acid groups, sulphonic acid groups, and carboxylic acid groups.

There are also potentially ionic functional monomers that may become cationic upon addition of acid, such as dimethylamino ethyl(meth)acrylate, dimethylamino propyl(meth) acrylate, and dimethylamino propyl(meth)acrylamide. Such potentially ionic functional monomers may contribute to improved adhesion and may also improve stability or appearance on specific substrates such as wood.

Preferably any ionic water-dispersing groups are anionic water dispersing groups.

Preferred ethylenically unsaturated monomer units bearing ionic or potentially ionic water-dispersing functional groups include (meth)acrylic acid, itaconic acid, maleic acid, β-carboxyethyl acrylate, monoalkyl maleates (for example monomethyl maleate and monoethyl maleate), citraconic acid, styrenesulphonic acid, sodium styrenesulphonate, vinylbenzylsulphonic acid, vinylsulphonic acid, sodium vinylsulphonate, acryloyloxyalkyl sulphonic acids (for example acryloyloxymethyl sulphonic acid), 2-acrylamido-2-alkylalkane sulphonic acids (for example 2-acrylamido-2-methylethanesulphonic acid), 2-methacrylamido-2-alkylalkane sulphonic acids (for example 2-methacrylamido-2-methylethanesulphonic acid), mono(acryloyloxyalkyl) phosphates (for example, mono(acryloyloxyethyl)phosphate and mono(3-acryloyloxypropyl)phosphates) and mono (methacryloyloxyalkyl)phosphates, and/or mixtures thereof.

Ethylenically unsaturated monomer units bearing water-dispersing functional groups may also include ethylenically unsaturated monomer units bearing non-ionic water dispersing groups such as pendant polyoxyalkylene groups, more preferably polyoxyethylene groups such as methoxy(poly-ethyleneoxide(meth)acrylate), hydroxy polyethylene glycol (meth)acrylates, alkoxy polyproplene glycol(meth)acrylates and hydroxy polypropylene glycol(meth)acrylates, preferably having a number average molecular weight of from 350 to 3,000 g/mol. Examples of such ethylenically unsaturated monomers which are commercially available include w-methoxypolyethylene glycol(meth)acrylate. Other vinyl monomers providing non-ionic water dispersible groups include (meth)acrylamidemono(methacryloyl oxethyl)phosphate and acrylamide.

Preferably ethylenically unsaturated monomer units bearing water-dispersing functional groups are selected from the group consisting of ionic water-dispersing or potentially ionic water-dispersing functional groups with a pKa<4.5, non-ionic water-dispersing groups and mixtures thereof.

Monomers which may also provide some crosslinking properties such as (meth)acrylic acid, are considered herein as monomers providing water-dispersing functional groups.

Preferably 0 to 16 mol % of ethylenically unsaturated monomer units bearing non-ionic water-dispersing groups is used, more preferably 0 to 10 mol % and most preferred 0 to 7 mol % based on the block copolymer.

Preferably block [A] comprises 0 to 35 mol %, more preferably 0 to 25 mol % and most preferably 2 to 20 mol % of ethylenically unsaturated monomer units bearing non-ionic water dispersing groups.

Preferably block [B] comprises 0 to 16 mol %, more preferably 0 to 12 mol % and most preferably 2 to 7 mol % of ethylenically unsaturated monomer units bearing non-ionic water dispersing groups.

Preferably block [A] comprises 50 to 100 mol %, more preferably 75 to 100 mol % of component ii).

Preferably block [B] comprises 0 to 10 mol %, more preferably 0 to 5 mol % and especially 1 to 10 mol % of component ii).

Preferably polymer P comprises 0 to 10 wt % and more preferably 0 to 5 wt % of component ii).
Component III)

Conveniently component iii) may comprise linear or branched acyclic esters of acrylic acid and methacrylic acid of formula 1

$$CH_2=CR^5-COOR^4 \qquad \text{Formula I}$$

wherein $R^5$ is H or methyl and $R^4$ is optionally substituted $C_1$ to $C_8$ alkyl, aryl or (alkyl)aryl which are also known as acrylic or methacrylic monomers, examples of which are methyl (meth)acrylate, ethyl(meth)acrylate, propyl(meth)acrylate (all isomers), butyl(meth)acrylate (all isomers) and 2-ethyl-hexyl(meth)acrylate.

Preferably block [A] comprises 0 to 35 mol %, more preferably 0 to 25 mol % of component iii).

Preferably block [B] comprises 0 to 35 mol %, more preferably 0 to 25 mol % of component iii).

Preferably polymer P comprises 60 to 100 wt % and more preferably 70 to 100 wt % of component iii).
Component IV)

Conveniently component iv) may comprise monomers selected from the group consisting of styrenic monomers such as styrene, α-methylstyrene, t-butyl styrene, chloromethyl styrene, $C_6$ to $C_{20}$ optionally substituted alkyl, cyclo alkyl and or aryl(meth)acrylate monomers such as isobornyl (meth)acrylate, isodecyl(meth)acrylate, lauryl(meth)acrylate, tridecyl(meth)acrylate, tetradecyl(meth)acrylate, hexadecyl(meth)acrylate, octadecyl(meth)acrylate (=stearyl (meth)acrylate), dicyclopentenyloxymethyl(meth)acrylate, benzyl(meth)acrylate, 2-phenoxyethyl(meth)acrylate, 3,3,5-trimethyl-cyclohexyl(meth)acrylate, p-methylphenyl(meth) acrylate, 1-naphtyl(meth)acrylate, 3-phenyl-n-propyl(meth) acrylate and 2-phenyl-aminoethyl(meth)acrylate, $C_6$ to $C_{20}$ optionally substituted alkyl(meth)acrylamide monomers such as t-octyl(meth)acrylamide and n-decyl(meth)acrylamide, vinylic monomers such as vinyl toluene, vinyl esters of versatic acid like VEOVA® 9 or VEOVA® 10, vinyl chloride and vinylidene chloride, and mixtures thereof.

Preferably the ethylenically unsaturated monomer units bearing plastic adhesion promoting functional groups are selected from the group consisting of $C_6$ to $C_{20}$ (preferably $C_6$ to $C_{20}$ optionally substituted alkyl, cyclo alkyl and or aryl (meth)acrylate monomers, styrenic monomers, $C_6$ to $C_{20}$ (preferably $C_6$ to $C_{15}$) optionally substituted alkyl(meth) acrylamide monomers, vinylic monomers and mixtures thereof.

More preferably the ethylenically unsaturated monomer units bearing plastic adhesion promoting functional groups are selected from the group consisting of $C_6$ to $C_{20}$ (preferably $C_6$ to $C_{15}$) optionally substituted alkyl, cyclo alkyl and or aryl(meth)acrylate monomers and mixtures thereof.

Preferably block [A] comprises 0 to 2 mol %, more preferably 0 mol % of component iv).

Preferably block [B] comprises 50 to 100 mol %, more preferably 75 to 100 mol % of component iv).

When the plastic substrate is polyolefinic, particularly polypropylene or a copolymer of propylene and another olefin like ethylene, then preferably component iv) of block [B] comprises at least 50 mol %, and more preferably at least 70 mol % and especially at least 90 mol % of isobornyl(meth) acrylate.

Preferably polymer P comprises 5 to 50 wt %, more preferably 4 to 40 wt % and especially 10 to 40 wt % of component iv). When the plastic substrate is a polyolefin, particularly polypropylene or a copolymer of propylene and another olefin like ethylene, then preferably component iv) of polymer P comprises at least 50 wt %, and more preferably at least 70 wt % and especially at least 90 wt % of isobornyl(meth) acrylate.
Component V)

Conveniently component v) may comprise dienes such as 1,3-butadiene and isoprene; vinyl monomers such as acrylonitrile, methacrylonitrile; vinyl halides such as vinyl chloride; vinylidene halides such as vinylidene chloride; vinyl esters such as vinyl acetate, vinyl propionate, vinyl laurate; heterocyclic vinyl compounds; alkyl esters of mono-olefinically unsaturated dicarboxylic acids such as di-n-butyl maleate and di-n-butyl fumarate; amides of unsaturated carboxylic acids such as (meth)acrylamide, N-methylol(meth)acrylamide and N-alkyl(meth)acrylamides.

The Tg of a polymer herein stands for the glass transition temperature and is well known to be the temperature at which a polymer changes from a glassy, brittle state to a rubbery state. Tg values of polymers may be determined experimentally using techniques such as Differential Scanning calorimetry (DSC) or calculated theoretically using the well-known Fox equation where the Tg (in Kelvin) of a copolymer having "n" copolymerised comonomers is given by the weight fractions "W" and the Tg values of the respective homopolymers (in Kelvin) of each comonomer type according to the equation "$1/Tg=W_1/Tg_1+W_2/Tg_2+ \ldots W_n/Tg_n$". The calculated Tg in Kelvin may be readily converted to ° C.

Preferably the calculated Tg of block [A] is in the range of from 0° C. to 150° C.

Preferably the calculated Tg of block [A] is ≥10° C., most preferably ≥20° C. and especially ≥30° C.

Preferably the calculated Tg of block [A] is ≤130° C. and most preferably ≤120° C.

Preferably the calculated Tg of polymer P is ≥-10° C., more preferably in the range of from -5 to 100° C., most preferably -5 to 70° C. and especially -5 to 50° C.

The weight average molecular weights (Mw) or number average molecular weights (Mn) of the block copolymer may be determined by using gel permeation chromatography (GPC) with THF as a solvent and polystyrene standards.

Preferably block [A] has a number average molecular weight in the range of from 300 to 10,000 g/mol and more preferably 500 to 5,000 g/mol.

Preferably block [B] has a number average molecular weight in the range of from 1,000 to 75,000 g/mol and more preferably 2,000 to 50,000 g/mol.

Preferably block copolymer $[A]_x[B]_y$ has a weight average molecular weight ≤100,000 g/mol, more preferably ≤75,000 g/mol and especially ≤50,000 g/mol.

Preferably the composition (block copolymer $[A]_x[B]_y$ and polymer P) has a weight average molecular weight in the range of from 2,000 to 750,000 g/mol, more preferably 10,000 to 500,000 and especially 20,000 to 400,000 g/mol.

Preferably block [B] and polymer P are more hydrophobic than block [A]. The hydrophobicity of a polymer may be determined by the Hansch parameter. The Hansch parameter for a polymer is calculated using a group contribution method. The monomer units forming a polymer are assigned a hydrophobicity contribution and the hydrophobicity of the polymer, the Hansch parameter, is calculated based on the weight average of the monomers in the polymer as disclosed in for example C. Hansch, P. Maloney, T. Fujita, and R. Muir, Nature, 194. 178-180 (1962). Values of the hydrophobicity contributions for several monomers are for example: styrene 4.29, α-methylstyrene 4.7, methyl methacrylate 1.89, butyl acrylate 3.19, and acrylic acid -2.52. Therefore a polymer made up of STY (20) αMS (20) MMA (20) BA (10) AA (30) has a Hansch value of 1.74.

Preferably the Hansch parameter for block [A] is lower than that for block [B] and lower than that for polymer P.

Block [A] may have a Hansch parameter less than or equal to 1.7, preferably ≤1.5, more preferably ≤1.2, still more preferably ≤1.0, most preferably 0.8, especially ≤0.6 and for example ≤0.5.

Block [B] may have a Hansch parameter greater than or equal to 1.0, preferably ≥1.5, more preferably ≥1.7, most preferably ≥2.0 and especially ≥2.2.

Preferably polymer P has a Hansch parameter greater than or equal to 1.7, more preferably ≥2.0 and most preferably ≥2.5.

When in the form of an aqueous dispersion, the block copolymer $[A]_x[B]_y$ preferably has an acid value from 5 to 150 mgKOH/g and more preferably 20 to 100 mgKOH/g of block copolymer $[A]_x[B]_y$.

When in the form of an aqueous dispersion the polymer P has an acid value ≤50, more preferably ≤15 and especially ≤10 mgKOH/g of polymer P.

The aqueous composition of the invention preferably has an acid value ≤100, more preferably ≤70 and especially ≤50 mgKOH/g of total polymer in the composition.

The RAFT polymerisation process for obtaining block [A] and/or block [B] may be carried out in bulk, in solution, in emulsion, in dispersion or in suspension. Preferably the RAFT polymerisation process for obtaining block [A] may be performed in solution. Preferably the RAFT polymerisation process for obtaining block [B] may be performed in solution or by emulsion polymerisation, more preferably in solution. Solution polymerisation is a polymerisation process in which all the reaction components including the monomer(s), initiator and control agent are dissolved in a non-monomeric liquid solvent at the start of the reaction. By non-monomeric is meant a solvent that does not comprise monomers, in other words that won't react as part of the polymerisation. Usually the solvent is also able to dissolve the polymer or copolymer that is being formed. By a solvent is meant water, organic solvents or mixtures thereof.

Preferably the block copolymer is prepared according a solution dispersion polymerization process, which comprises the preparation of the block copolymer in solution using a RAFT radical polymerisation process and the dispersion of the obtained block copolymer in water. Dispersion of the block copolymer in water can be performed by adding water to the block copolymer solution or by adding the block copolymer solution to water. Optionally suitable surfactants can be used to aid in the dispersion process. The block copolymer preferably comprises acid-functional groups that can be transformed into anionic functional water-dispersing groups by addition of a suitable organic or inorganic base such as for example ammonia, triethylamine or sodium hydroxide. Preferred bases are volatile amines, such as ammonia, or neutralising agents which decompose without leaving inorganic residues which are sensitive to water in the final dried coating. After the block copolymer is dispersed in water the remaining solvent can optionally be removed for example under reduced pressure.

Preferred organic solvents include alcohols (such as ethanol, isopropanol, n-butanol, n-propanol, cyclohexanol), esters (such as ethyl acetate, propyl acetate, isopropyl acetate, butyl acetate), ketone solvents (such as acetone, methyl ethyl ketone, methyl isobutyl ketone), and glycols (such as butyl glycol). More preferred organic solvents include solvents selected from the group consisting of acetone, ethanol, methyl ethyl ketone, iso-propanol, ethyl acetate, butyl glycol and mixtures thereof. Preferably the solvent is a mixture of water and a suitable organic solvent like an alcohol. Preferably the solvent applied for the block copolymer preparation using the solution dispersion polymerisation process comprises an organic solvent with a low boiling point and or a high evaporation rate to allow fast removal of the organic solvent after the dispersion step under reduced pressure. Examples of such solvents include acetone, ethanol, isopropanol, methyl ethyl ketone and ethyl acetate.

A process for preparing a block having a gradient composition comprises continually introducing a first monomer feed to a reactor, where the first monomer feed continually varies in its compositional feed content during the continuous introduction by the addition of a different second monomer feed to the first monomer feed and polymerising the monomers introduced into the reactor.

The addition of the second monomer feed to the first monomer feed may be in parallel to the introduction of the first monomer feed to the polymerisation (i.e. both feeds start and end at the same time). Alternatively the start of monomer feed one to the reactor may precede the start of the addition of the second monomer feed to the first monomer feed, or both monomer feeds may be started simultaneously but the time taken for the addition of the second monomer feed to the first monomer feed may exceed the time taken for the introduction of the first monomer feed to the reactor.

A block having a gradient composition may also be obtained by the simultaneous introduction of a first and a second monomer feed into the reactor where the rate of the introduction of the first monomer feeds varies with respect to the rate of the introduction of the second monomer feed.

The at least two monomer feeds used to prepare the block having a gradient composition usually differ in composition. The difference between the at least two monomer feeds may be for example a difference in monomer composition, a difference in glass transition temperature (Tg), or simply a variation in the concentration of the respective monomers in each monomer feed.

Block [A] and [B] can be prepared in any order.

Polymer P is prepared using a radical emulsion polymerisation process in the presence of the block copolymer $[A]_x[B]_y$, where optionally the control agent functional group located at one of the chain ends of the prepared block copolymer $[A]_x[B]_y$ can be deactivated or removed prior to the preparation of polymer P. General methods for preparing aqueous vinyl polymers are reviewed in the Journal of Coating Technology, volume 66, number 839, pages 89 to 105 (1995). The control agent may optionally be removed before or after dispersion of the block copolymer and before or after the polymer preparation. When a RAFT agent is used as control agent the RAFT group can be deactivated or removed via for example oxidation reactions, radical induced reactions, hydrolysis, or aminolysis. In the case that the control agent functional group is not removed or only partially removed prior to the preparation of polymer P at least part of the polymer P chains will grow onto or become covalently attached to at least part of the block copolymer chains.

Preferably the chain end functionality of the block copolymer $[A]_x[B]_y$ is retained to assist with the covalent bond formation between the block copolymer and polymer P. The chain end functionality of the block copolymer may be a RAFT group (—S—C(=S)—) or a thiol (—SH) group or any other group derived from the RAFT control agent that can provide covalent bond formation between the block copolymer and polymer P.

Preferably at least 20 wt % of polymer P is covalently bonded to the block copolymer.

In an embodiment of the invention there is provided an aqueous composition comprising a block copolymer and a polymer obtained according to the process of the invention. The aqueous composition may contain free block copolymer $[A]_x[B]_y$ and free polymer P. Preferably, the block copolymer $[A]_x[B]_y$ and polymer P are partially grafted by means of covalent bond(s) between the block copolymer $[A]_x[B]_y$ and polymer P.

In another embodiment of the invention there is provided a process for preparing a composition according to the invention wherein said method comprises the following steps:
1. synthesis in a solvent by means of a RAFT radical polymerisation process of a first block [A] followed by the polymerisation of at least a second block [B]. The order of preparation of [A] and [B] can also be reversed;
2. optional removal of the control agent before, during or after dispersing the block copolymer $[A]_x[B]_y$ in water;
3. optional removal of the solvent from block copolymer $[A]_x[B]_y$;
4. dispersion of the block copolymer $[A]_x[B]_y$ in water optionally containing monomers, by adding either water to the block copolymer $[A]_x[B]_y$ or adding the block copolymer $[A]_x[B]_y$ to water, optionally using surfactants, preferably by addition of a base;
5. optional removal of solvent from the block copolymer $[A]_x[B]_y$ dispersion (if solvent is still present from step 4.);
6. performing an emulsion polymerisation process of monomers in the presence of the block copolymer $[A]_x[B]_y$ dispersion prepared in step 4 and or step 5 to obtain polymer P.

Alternatively after step 1 the solvent is removed by a suitable method to get a solid, which solid can be afterwards dispersed into water.

Furthermore the polymerisation process to make the block copolymer or the polymer may be carried out as either a batch, semi-batch or a continuous process. When the polymerisation process for the block copolymer is carried out in the batch mode, the reactor is typically charged with control agent and monomer. To the mixture is then added the desired amount of initiator. The mixture is then heated for the required reaction time. In a batch process, the reaction may be run under pressure to avoid monomer reflux.

Semi-batch operation typically involves the continuous or step-wise addition of monomer(s) (and/or other ingredients) during polymerisation, and is often applied in copolymerisations to minimize copolymer composition drift in case monomer reactivities are very different. If the polymerisation process for the block copolymer is to be carried out as a semi-batch process, the reaction is typically carried out as follows: the reactor is charged with a polymerisation medium, typically an organic solvent, the control agent, and optionally (part of) the initiator. Into a separate vessel are placed the monomer(s) and optionally polymerisation medium and initiator. For safety reasons the initiator can also be added via another separate vessel. The polymerisation medium in the reactor is heated and stirred while the monomer(s) and initiator are step-wise or gradually introduced. The rate of monomer and/or initiator addition is determined largely by the quantity of solution and/or the rate of polymerisation. When the additions are completed, heating may be continued for an additional period of time with or without additional initiator to reduce unreacted monomer levels.

Furthermore after preparation of a first block, the prepared block can be purified from residual monomers and subsequently used for the polymerisation of a second monomer composition as a second block or the second monomer composition can be polymerised directly after the preparation of first block is completed. In this case at least 80 wt %, preferably at least 90 wt %, most preferred at least 95 wt % of the first block monomer composition is reacted before the second monomer composition is reacted. The second block can contain up to 20 wt % (preferably 10 wt % or less) of the first monomer composition.

A free-radical polymerisation of ethylenically unsaturated monomers to make either the block copolymer and or the polymer will require the use of a source of free radicals (i.e. an initiator) to initiate the polymerisation. Suitable free-radical-yielding initiators include inorganic peroxides such as K, Na or ammonium persulphate, hydrogen peroxide, or percarbonates; organic peroxides, such as acyl peroxides including for example benzoyl peroxide, alkyl hydroperoxides such as t-butyl hydroperoxide and cumene hydroperoxide; dialkyl peroxides such as di-t-butyl peroxide; peroxy esters such as t-butyl perbenzoate; mixtures may also be used. The peroxy compounds are in some cases advantageously used in combination with suitable reducing agents (redox systems) such as iso-ascorbic acid. Metal compounds such as Fe.EDTA (ethylene diamine tetracetic acid) may also be usefully employed as part of the redox initiator system. Azo functional initiators such as 2,2'-azobis(isobutyronitrile) (AIBN), 2,2'-azobis(2-methyl-butyronitrile) (AMBN) and 4,4'-azobis(4-cyanovaleric acid) may also be used. The amount of initiator or initiator system to use is conventional. For the preparation of the block copolymer preferably the molar amount of initiator does not exceed the molar amount of control agent that is applied. A further amount of initiator may optionally be added at the end of the polymerisation process to assist the removal of any residual ethylenically unsaturated monomers.

A chain transfer agent may be added to control the molecular weight of the polymer. Suitable chain transfer agents include mercaptans such as n-dodecylmercaptan, n-octylmercaptan, t-dodecylmercaptan, mercaptoethanol, iso-octyl thioglycolate, $C_2$ to $C_8$ mercapto carboxylic acids and esters thereof such as 3-mercaptopropionic acid and 2-mercaptopropionic acid; and halogenated hydrocarbons such as carbon tetrabromide and bromotrichloromethane. Preferably no chain transfer agent is added during the preparation of the block copolymer.

Surfactants can be utilised in order to assist in the dispersion of the block copolymer or polymer, and or in the emulsification of the monomers in water (even if self-dispersible). Suitable surfactants include but are not limited to conventional anionic, cationic and/or nonionic surfactants and mixtures thereof such as Na, K and $NH_4$ salts of dialkylsulphosuccinates, Na, K and $NH_4$ salts of alkyl sulphonic acids, Na, K and $NH_4$ alkyl sulphates, ethoxylated fatty acids and/or fatty amides, and Na, K and $NH_4$ salts of fatty acids such as Na stearate and Na oleate. Other anionic surfactants include alkyl or (alk)aryl groups linked to sulphonic acid groups, sulphuric acid half ester groups (linked in turn to polyglycol ether groups), phosphonic acid groups or carboxylic acid groups. Cationic surfactants include alkyl or (alk)aryl groups linked to quaternary ammonium salt groups. Nonionic surfactants include polyglycol ether compounds and preferably polyethylene oxide compounds as disclosed in "Nonionic surfactants—Physical chemistry" edited by M. J. Schick, M. Decker 1987.

If monomers bearing crosslinking functional groups are present, then crosslinking may be introduced by combining the block copolymer obtained by the process of the invention with a separate crosslinker to provide either a self-crosslinking system (with a long potlife, triggered by for instance a change in temperature or pH or the evaporation of one of the ingredients in the overall system, like a solvent or water), or a two pack system.

A separate crosslinking agent is preferably selected from group consisting of polyhydrazides (including dihydrazides such as adipic acid dihydrazide), polyisocyanates, carbodiimides, polyaziridines, epoxies, melamine resins and mixtures thereof.

The composition obtained by the process of the invention can be in the form of a solid, a solution or as an aqueous dispersion. Most preferably the composition is used in an aqueous composition.

Furthermore the composition obtained by the process of the invention is particularly suitable for use in coating applications in which it may provide a key part of coating compositions or formulations. The composition may be used in compositions suitable for applications such as adhesives, coatings, films, cosmetics, inks. Such coating compositions can be pigmented or unpigmented. Such coating compositions may be applied to a variety of plastic substrates by any conventional method including brushing, dipping, flow coating, spraying, flexo printing, gravure printing any other graphic arts application methods and the like. The aqueous carrier medium is removed by natural drying or accelerated drying (by applying heat) to form a coating.

The coating composition can be applied to a broad variety of plastic substrates, including for example polyolefins such as polypropylene (PP) (treated and untreated) and polyethylene (PE), polyamide, polycarbonate (PC), polyethyleneterepthalate (PET), polymethyl methacrylate (PMMA), polystyrene (PS), acrylonitrile/butadiene/styrene copolymer (ABS), polytetrafluoroethylene (PTFE)) and polyvinyl chloride (PVC).

The polyolefins comprise in particular olefin polymers, especially polymers of olefins containing 2 to 8, and preferably 2 to 5 and most preferably 3 carbon atoms. The polyolefins include, without being limited thereto, polyethylene, polypropylene, polybutenes, polypentenes, and copolymers of these with small amounts of other monomers with which they are copolymerizable. Included are such copolymers containing at least 85% by weight of olefin units.

Of greatest importance is the group of polyolefins known as "untreated polyolefins" and particularly "untreated polypropylene". Untreated polyolefin surfaces are difficult to bond as well as to wet. The difficulty is often ascribed to the non-polar and hydrophobic nature of the purely hydrocarbon surface present on these materials. Polypropylene has been singled out as being especially difficult and it has been suggested that the reason for the particular difficulty in bonding to untreated polypropylene is that the surface consists essentially of methyl groups. Although treatment of polyolefin substrates such as corona treatment of polypropylene films or flame treatment of polypropylene articles is commonly applied to improve wetting and coating adhesion, it is often found that these treatments are insufficient or incomplete and therefore do not give the desired adhesion performance. Furthermore, treated polypropylene films for example show a decrease in surface tension over time upon storage, and may therefore require an additional treatment step shortly before application of the coating to prevent serious issues in wetting and coating adhesion. The coating composition of the invention however provides good adhesion to both treated and untreated polypropylene, and can therefore advantageously be applied to both untreated polypropylene substrates and to treated or partly treated polypropylene substrates. It may also be applied to treated or untreated substrates made from blends of polypropylene with other polymers such as poly(ethylene/propylene/diene), polyphenylene sulphide, polyphenylene oxide etc. The substrate may be in the form of a moulded or extruded article or film. Polypropylene films include oriented polypropylene (OPP) and biaxially oriented polypropylene (BOPP) films, which may be treated or untreated.

Polyolefins like PE and PP and fluorocarbons (like polytetrafluoroethylene (PTFE)) are considered as very hydrophobic plastic substrates. Adhesion to such very hydrophobic plastics typically requires the use of blocks (preferably long blocks) of hydrophobic monomers that can mix and/or entangle and/or co-crystallise with the polymer chains from the plastic substrate surface (often in combination with a co-solvent and/or elevated drying temperature to mobilise the chains). Preferably the monomers used in the block copolymer are compatible with the monomers present in the plastic. For example if a polypropylene substrate is used it is advantageous to use an isobornyl(meth)acrylate rich block to improve adhesion to the substrate.

Preferably the plastic substrate is a hydrophobic plastic. Examples of hydrophobic plastic substrates include (non-modified or untreated) polypropylene (PP), polyethylene (PE), polytetrafluoroethylene (PTFE) and polystyrene (PS). Most preferably the substrate is untreated PP.

In a preferred embodiment the aqueous coating composition of the invention is suitable for coating polyolefins, more preferably propylene, most preferably untreated polypropylene.

Optionally in one embodiment of the invention the composition obtained or obtainable by the process of the invention may comprise one or more solventborne or waterborne adhesion promoting resins such as chlorinated polyolefin (CPO) or chlorine-free modified polyolefin resins. Such resins may advantageously be used in amounts ranging from 1 to 40 wt % preferably 3 to 25 wt % based on total binder solids for further increasing the overall level of coating adhesion to very hydrophobic plastics such as polypropylene. Preferred examples of polyolefin adhesion promoters comprise waterborne chlorinated polyolefins (such as those available commercially from Nippon Paper Chemicals under the trade designations Superchlon E-723, E-673, and/or E-503), and the environmentally more preferred waterborne non-chlorinated (acrylic modified) polyolefins (such as that available commerically from Eastman under the trade name Advantis 510 W and/or those available commercially from Nippon Paper Chemicals under the trade designations Auroren AE-201 and/or AE-301).

For plastic adhesion a co-solvent may be needed to swell the surface of the plastic to allow a certain degree of chain interdiffusion.

Suitable organic co-solvents which may be added during the process or after the process during formulation steps are well known in the art and include xylene, toluene, methyl ethyl ketone, acetone, ethanol, isopropanol, ethyl acetate, butyl acetate, diethylene glycol, ethylene diglycol, butyl glycol, butyl diglycol, dipropylene glycol methyl ether, propylene glycol n-butyl ether, dipropylene glycol n-butyl ether, and 1-methyl-2-pyrrolidinone.

Preferably the aqueous composition comprises ≤50 wt %, more preferably from ≤40 wt % and most preferably from ≤35 wt % of organic co-solvent by weight of total polymer.

Preferably only a low concentration of aromatic solvent is added. Preferably less than 10 wt %, more preferably less than 5 wt % and most preferred less than 2 wt % of aromatic solvent by weight of total polymer is added.

The solids content of the aqueous composition is preferably from 20 to 60 wt %, and most preferably from 30 to 50 wt %.

If desired the composition obtained by the process of the invention can be used in combination with other polymer compositions which are not according to the invention.

In another embodiment there is provided an aqueous emulsion according to the invention additionally comprising a polymer Q, wherein the solids content of the blockcopolymer-polymer P together is ≥1 wt % and ≤35 wt % based on total solids content of blockcopolymer-polymer P and polymer Q together. Preferably polymer Q is an acrylic, urethane, urethane-acrylic, alkyd, alkyd-acrylic or another type of polymer.

In a preferred embodiment there is provided a blend of an aqueous polymer Q dispersion comprising an acrylic, urethane, urethane-acrylic, alkyd, alkyd-acrylic or another type of polymer Q with the aqueous emulsion of the invention. The advantage of such blending is that the overall performance properties of the aqueous polymer dispersion (coating) are retained, and additionally the aqueous emulsion of the invention provides improved adhesion of the coating to plastic substrates, and in particular hydrophobic plastic substrates such as polypropylene.

Preferably the solids content of the aqueous emulsion prepared by the process of the invention added to the aqueous polymer Q dispersion amounts ≤35 wt % on total solids content of the blend and more preferably ≤25 wt %. Preferably the solids content of the aqueous emulsion prepared by the process of the invention added to the aqueous polymer Q dispersion amounts ≥1 wt % on total solids content of the blend and more preferably ≥5 wt %.

Preferably the polymer Q dispersion that is added to the aqueous emulsion prepared by the process of the invention is an aqueous acrylic polymer dispersion.

Preferably the particle size of the polymer Q dispersion that is blended with the aqueous emulsion prepared by the process of the invention of the invention is in the range of from 50 to 400 nm, preferably ≥100 nm. Preferably the particle size of the aqueous emulsion according to the invention is ≤100 nm.

In addition to the block copolymers and other ingredients already described herein, a coating composition of the invention may also contain further conventional ingredients such as: carrier medium, pigments, dyes, emulsifiers, surfactants, plasticisers, thickeners, heat stabilisers, levelling agents, anti-cratering agents, fillers, sedimentation inhibitors, UV absorbers, antioxidants, dispersants, reactive diluents, waxes, neutralising agents, adhesion promoters, defoamers, co-solvents, wetting agents, fire retardants and the like, any combinations thereof and/or any mixtures thereof. The ingredients may be introduced at any stage of the production process or subsequently.

The coating composition of the invention may be applied to a variety of plastic substrates by any conventional method including brushing, dipping, flow coating, spraying, and the like. A carrier medium if present may removed by natural drying or accelerated drying (e.g. by applying heat) to form a coating.

An aspect of the invention provides a coating composition and/or polymer obtained and/or obtainable by a process of the invention An aspect of the invention provides a coating composition obtained and/or obtainable by a process of the invention Another aspect of the invention provides a mixture of i) block copolymer comprising at least blocks $[A]_x[B]_y$, and ii) polymer P; where said mixture is obtained and/or obtainable by a process of the invention Yet another aspect of the invention provides a blockcopolymer-polymer comprising as components thereof i) block copolymer comprising at least blocks $[A]_x[B]_y$ and ii) polymer P; said blockcopolymer-polymer obtained and/or obtainable by a process of the invention.

A further aspect of the invention provides a coating obtained and/or obtainable from a coating composition, mixture and/or block copolymer-polymer of the invention.

Another aspect of the invention provides a substrate and/or article coated with a coating of the invention.

A still other aspect of the invention provides a method of coating a substrate and/or article comprising the steps of i) applying a coating composition, mixture and/or block copolymer-polymer of the invention to the substrate and/or article; ii) drying the substrate and/or article to form a coating thereon.

A further aspect of the invention provides use of a coating composition, mixture, block copolymer-polymer, substrate and/or article of the invention to coat a substrate and/or article.

A yet other aspect of the invention provides for a coated substrate and/or article obtained and/or obtainable by the method of coating of the invention.

A further aspect of the invention provides use of a coating composition, mixture, block copolymer-polymer, substrate and/or article of the invention in at least one of the applications described herein.

A still yet other aspect of the invention provides a method of manufacture of a coating composition, mixture, block copolymer-polymer, substrate and/or article of the invention for the purpose being used in at least one of the applications described herein.

The terms 'effective', 'acceptable' 'active' and/or 'suitable' (for example with reference to any process, use, method, application, preparation, product, material, formulation, compound, monomer, block copolymer, polymer precursor, and/or polymers of the present invention and/or described herein as appropriate) will be understood to refer to those features of the invention which if used in the correct manner provide the required properties to that which they are added and/or incorporated to be of utility as described herein. Such utility may be direct for example where a material has the required properties for the aforementioned uses and/or indirect for example where a material has use as a synthetic intermediate and/or diagnostic tool in preparing other materials of direct utility. As used herein these terms also denote that a functional group is compatible with producing effective, acceptable, active and/or suitable end products.

Preferably the utility, end use and/or applications for the polymers, compostions, substrates and/or articles of the present invention may be selected from at least one of the following non-limiting list, any combinations and/or mixtures thereof (some of which may overlap):

- coatings for plastic substrates and/or foams;
- coatings for surfaces having low surface energy;
- coatings for hydrophobic substrates such as for example polyolefins;
- coatings for polyolefins, such as polypropylene (PP), for example PP articles and oriented PP(OPP) and/or biaxial OPP (BOPP) films, either treated or preferably untreated;
- coatings for vehicles such as interior and/or exterior automotive coatings;
- coatings for consumer electronic articles, preferably the plastic parts thereof;
- coatings for furniture and/or household articles, preferably the plastic parts thereof;
- coatings for biomedical articles, preferably the plastic parts thereof such as catheters.

Many other variations embodiments of the invention will be apparent to those skilled in the art and such variations are contemplated within the broad scope of the present invention.

Further aspects of the invention and preferred features thereof are given in the claims herein.

EXAMPLES

The present invention is now illustrated by reference to the following non-limiting examples. Unless otherwise specified, all parts, percentages and ratios are on a weight basis. Molecular weights were determined by GPC using polystyrene standards and THF as eluent.

The prefixes Comp or C before an example denotes that it is comparative. The term "working" means that the example is according to the invention. The term "non-working" means that it is not according to the invention (i.e. comparative).

Various registered trademarks, other designations and/or abbreviations are used herein to denote some of ingredients used to prepare polymers and compositions of the invention. These are identified below by chemical name and/or tradename and optionally their manufacturer or supplier from whom they are available commercially. However where a chemical name and/or supplier of a material described herein is not given it may easily be found for example in reference literature well known to those skilled in the art: such as: 'McCutcheon's Emulsifiers and Detergents', Rock Road, Glen Rock, N.J. 07452-1700, USA, 1997 and/or Hawley's Condensed Chemical Dictionary (14th Edition) by Lewis, Richard J., Sr.; John Wiley & Sons.

In the examples, the following abbreviations and terms are specified:
DP=average degree of polymerization
AA=acrylic acid
BA=butyl acrylate
MMA=methyl methacrylate
BMA=butyl methacrylate
iBOA=isobornyl acrylate
xanthate 1=O-ethyl-S-(1-methoxycarbonyl)ethyl dithiocarbonate (Rhodixan A1, provided by Rhodia Chimie)
MEK=methyl ethyl ketone
SLS=sodium lauryl sulfate
APS=ammonium persulfate Molecular weights were determined by GPC relative to polystyrene standards.

An overview of the Examples and the Comparative Examples is given in Table 1.

TABLE 1

| Experiment | Block copolymer (BC) [DP]/Random copolymer (RC) [DP] | Polymer P (Tg °C.) | BC/RC wt % on total solids |
|---|---|---|---|
| Example 1 | BC1 = AA - iBOA [20-50] | BMA/BA (0° C.) | 26% |
| Example 2 | BC1 = AA - iBOA [20-50] | BMA/BA (0° C.) | 16% |
| Example 3 | BC1 = AA - iBOA [20-50] | BMA/BA (10° C.) | 26% |
| Example 4 | BC2 = AA - iBOA [50-100] | BMA/BA (0° C.) | 33% |
| Comparative Example 1a | RC1 = AA/iBOA [20/50]; 12 wt % AA | BMA/BA (0° C.) | 16% |
| Comparative Example 1b | RC2 = AA/iBOA [33/46]; 20 wt % AA | BMA/BA (0° C.) | 16% |
| Comparative Example 1c | RC3 = AA/iBOA [49/40]; 30 wt % AA | BMA/BA (0° C.) | 16% |
| Comparative Example 2 | BC3 = AA - BA [20-50] | BMA/BA (10° C.) | 16% |
| Comparative Example 3 | None | MMA/BA/iBOA/AA (21° C.) | — |
| Comparative Example 4 | None | BMA/BA/iBOA/AA (12° C.) | — |
| Comparative Example 5 | None | BMA/BA/iBOA/AA (25° C.) | — |

Block Copolymer 1

Synthesis of a $[A]_x$-$[B]_y$ Block Copolymer where Block [A] is Based on AA and x=20 and Block [B] is Based on iBOA with y=50

Block [A]:

170 gram of ethanol and 28 gram (0.14 mol) of xanthate 1 were added to a 1 L three-necked glass flask equipped with condenser cooler, temperature measuring probe and mechanical stirring device. The reaction mixture was degassed by purging with nitrogen at room temperature for 15 minutes while stirring. The temperature was raised to 75° C. and 10 wt % of a monomer feed mixture of 197 gram (2.74 mol) of AA and 228 gram of ethanol was added to the reaction mixture. Then a mixture of 2.3 gram (approximately 6 mmol) of 4,4'-azobis(4-cyanovaleric acid) (Aldrich, 75+%) and 25 gram of ethanol was added. After 15 minutes at 70° C. the gradual addition was started of the remaining 90 wt % of the AA/ethanol mixture. The addition lasted 4 hours under a weak nitrogen stream and at a controlled temperature of 70° C., after which the mixture was kept for 7 hours at 70° C. The reaction mixture was then cooled to 20° C. and a sample was withdrawn for further analysis. The conversion of AA as determined with gas chromatography was found to be 96% and the solids level was experimentally determined at 37.5%. GPC analysis of the final product resulted in the following values: Mn=1905 g/mol, PDI (=Mw/Mn)=1.30.

Block [B]:
237 gram of the block [A] reaction mixture, corresponding to approximately 54 mmol of precursor block [A] based on a solids level of 37.5% and a theoretical molecular weight of 1650 g/mol, and 60 gram of MEK were added to a 2 L three-necked glass flask equipped with condenser cooler, temperature measuring probe and mechanical stirring device. The reaction mixture was degassed by purging with nitrogen at room temperature for 15 minutes while stirring. The temperature was raised to 70° C. and 10 wt % of a monomer feed mixture of 562 gram (2.70 mol) of iBOA and 425 gram of MEK was added to the reaction mixture. Then a mixture of 3.0 gram (approximately 8 mmol) of 4,4'-azobis(4-cyanovaleric acid) (Aldrich, 75+%) and 20 gram of MEK was added to the reaction mixture. After 15 minutes at 70° C. the gradual addition was started of the remaining 90 wt % of the iBOA/MEK mixture. The addition lasted 4 hours under a weak nitrogen stream and at a controlled temperature of 70° C., after which the mixture was kept for about 10 hours at 70° C. The reaction mixture was then cooled to 20° C. and a sample was withdrawn for further analysis. The conversion of iBOA as determined with gas chromatography was found to be 97%. Theoretical solids level was 50%. GPC analysis of the final [A]-[B] block copolymer product resulted in the following values: Mn=4870 g/mol, PDI (=Mw/Mn)=2.25.

Block Copolymer 2

Synthesis of a $[A]_x$-$[B]_y$ Block Copolymer where Block [A] is Based on AA and x=50 and Block [B] is Based on iBOA with y=100

Block [A]:
189 gram of ethanol and 10.6 gram (51 mmol) of xanthate 1 were added to a 1 L three-necked glass flask equipped with condenser cooler, temperature measuring probe and mechanical stirring device. The reaction mixture was degassed by purging with nitrogen at room temperature for 15 minutes while stirring. The temperature was raised to 75° C. and 5 wt % of a monomer feed mixture of 184 gram (2.55 mol) of AA and 241 gram of ethanol was added to the reaction mixture. Then a mixture of 0.8 gram (approximately 2.2 mmol) of 4,4'-azobis(4-cyanovaleric acid) (Aldrich, 75+%) and 25 gram of ethanol was added. After 15 minutes at 70° C. the gradual addition was started of the remaining 95 wt % of the AA/ethanol mixture. The addition lasted 4 hours under a weak nitrogen stream and at a controlled temperature of 70° C., after which the mixture was kept for 7 hours at 70° C. The reaction mixture was then cooled to 20° C. and a sample was withdrawn for further analysis. The conversion of AA as determined with gas chromatography was found to be 94% and the solids level was experimentally determined at 33.1%. GPC analysis of the final product resulted in the following values: Mn=3040 g/mol, PDI (=Mw/Mn)=1.47.

Block [B]:
298 gram of the block [A] reaction mixture, corresponding to approximately 26 mmol of precursor block [A] based on a solids level of 33.1% and a theoretical molecular weight of 3810 g/mol, was added to a 2 L three-necked glass flask equipped with condenser cooler, temperature measuring probe and mechanical stirring device. The reaction mixture was degassed by purging with nitrogen at room temperature for 15 minutes while stirring. The temperature was raised to 70° C. and 10 wt % of a monomer feed mixture of 540 gram (2.60 mol) of iBOA and 500 gram of MEK was added to the reaction mixture. Then a mixture of 1.8 gram (approximately 5 mmol) of 4,4'-azobis(4-cyanovaleric acid) (Aldrich, 75+%) and 20 gram of MEK was added to the reaction mixture. After 15 minutes at 70° C. the gradual addition was started of the remaining 90 wt % of the iBOA/MEK mixture. The addition lasted 4 hours under a weak nitrogen stream and at a controlled temperature of 70° C., after which the mixture was kept for about 10 hours at 70° C. The reaction mixture was then cooled to 20° C., and 140 gram MEK was added to reduce the viscosity of the mixture. The conversion of iBOA as determined with gas chromatography was found to be 95%. Theoretical solids level was 45%. GPC analysis of the final [A]-[B] block copolymer product resulted in the following values: Mn=5890 g/mol, PDI (=Mw/Mn)=2.66.

Block Copolymer 3

Synthesis of a $[A]$-$[B]_y$ Block Copolymer where Block [A] is Based on AA and x=20 and Block [B] is Based on BA with y=50

The block [A] reaction mixture for block copolymer 3 was prepared according a similar recipe and procedure as described for block copolymer 1 (data for block [A] from GPC analysis: Mn=2190 g/mol, PDI (=Mw/Mn)=1.25). For the preparation of block [B] of block copolymer 3, 164.7 gram of the block [A] reaction mixture, corresponding to approximately 40 mmol of precursor block [A] based on a solids level of 40.1% and a theoretical molecular weight of 1650 g/mol, and 14 gram of MEK were added to a 1 L three-necked glass flask equipped with stirrer, condenser cooler and temperature measuring probe. The reaction mixture was degassed by purging with nitrogen at room temperature for 15 minutes while stirring. The temperature was raised to 75° C. and 10 wt % of a monomer feed mixture of 256.8 gram (2.0 mol) of BA and 202.4 gram of MEK was added to the reaction mixture. Then a mixture of 2.24 gram (approximately 6 mmol) of 4,4'-azobis(4-cyanovaleric acid) (Aldrich, 75+%) and 10 gram of MEK was added. After 15 minutes at 70° C. the gradual addition was started of the remaining 90 wt % of the BA/MEK mixture. The addition lasted 4 hours under a weak nitrogen stream and at a controlled temperature of 70° C., after which the mixture was kept for 6 hours at 70° C. The reaction mixture was then cooled to 20° C. and a sample was withdrawn for further analysis. The conversion of BA as determined with gas chromatography was found to be 96% and the solids level was experimentally determined at 49.8%. GPC analysis of the final [A]-[B] block copolymer product resulted in the following values: Mn=6610 g/mol, PDI (=Mw/Mn)=1.59.

Random copolymers of AA and iBOA (RC1; RC2; RC3) Synthesis of Random Copolymer RC1 of AA and iBOA with the Same Overall Composition as Block Copolymer 1 (wt % AA=12%; DP AA=20 and DP iBOA=50)

130 gram of MEK and 6.0 gram (29 mmol) of xanthate 1 were added to a 1 L three-necked glass flask equipped with condenser cooler, temperature measuring probe and mechanical stirring device. The reaction mixture was degassed by purging with nitrogen at room temperature for 15 minutes while stirring. The temperature was raised to 75° C. and 10 wt % of a monomer feed mixture of 41.8 gram (0.58 mol) of AA, 302.0 gram (1.45 mol) of iBOA, and 200 gram MEK was added to the reaction mixture. Then a mixture of 2.20 gram (approximately 6 mmol) of 4,4'-azobis(4-cyanovaleric acid) (Aldrich, 75+%) and 23 gram of ethanol was added. After 15 minutes at 70° C. the gradual addition was started of the remaining 90 wt % of the AA/iBOA/MEK mixture. The addition lasted 5 hours under a weak nitrogen stream and at a controlled temperature of 70° C., after which the mixture was kept for 5 hours at 70° C. The reaction mixture was then cooled to 20° C. and a sample was withdrawn for further analysis.

The synthesis of random copolymer RC2 (20 wt % AA; DP AA=33 and DP iBOA=46) and random copolymer RC3 (30 wt % AA; DP AA=49 and DP iBOA=40) was performed according the same recipe and procedure as described above, where the ratio of AA and iBOA in the monomer feed mixture was adjusted to obtain the desired degree of polymerization. The theoretical solids level of RC1, RC2 and RC3 was 50%. GPC analysis of the final random copolymers resulted in the following values: RC1 Mn=5655 g/mol and PDI=2.03; RC2 Mn=6515 g/mol and PDI=2.01; RC3 Mn=6120 g/mol and PDI=2.14.

Preparation of an Aqueous Dispersion of Block Copolymer 1

53.3 gram of triethylamine was added to 660 gram of block copolymer 1 at 20° C. whilst stirring. To the obtained mixture an amount of 1320 gram demineralized water was slowly added under stirring, resulting in the formation of a stable aqueous dispersion. After removal of residual MEK from the dispersion under reduced pressure the pH was measured at 8.1 and the final solids level was experimentally determined at 24.3%. The particle size of the dispersion as determined with light scattering was 40 nm.

Preparation of an Aqueous Dispersion of Block Copolymer 2

38.7 gram of triethylamine was added to 460 gram of block copolymer 2 at 20° C. whilst stirring. To the obtained mixture an amount of 828 gram demineralized water was slowly added under stirring, resulting in the formation of a stable aqueous dispersion. After removal of residual MEK from the dispersion under reduced pressure the pH was measured at 7.8 and the final solids level was experimentally determined at 22.6%. The particle size of the dispersion as determined with light scattering was 117 nm.

Preparation of an Aqueous Dispersion of Block Copolymer 3

35.8 gram of triethylamine was added to 401 gram of block copolymer 3 at 20° C. whilst stirring. To the obtained mixture an amount of 800 gram demineralized water was slowly added under stirring, resulting in the formation of a stable aqueous dispersion. After removal of residual MEK from the dispersion under reduced pressure the pH was measured at 7.0 and the final solids level was experimentally determined at 22.9%. The particle size of the dispersion as determined with light scattering was 32 nm.

Preparation of an Aqueous Dispersion of Random Copolymers RC1, RC2 and RC3

The preparation of an aqueous dispersion of random copolymer RC1 was performed according a similar recipe and procedure as applied for block copolymer 1. For RC2 and RC3 the amount of triethylamine was adjusted to equal molar ratio to the number of carboxylic acid groups. After removal of residual MEK from the dispersion under reduced pressure the pH for RC1, RC2 and RC3 was measured at 8.5, 8.3 and 7.7, respectively. The final solids level for RC1, RC2 and RC3 was experimentally determined at 22.4%, 21.9% and 25.7%, respectively. The dispersions of RC1 and RC2 were of relatively poor quality; analysis with light scattering resulted in a very broad particle size distribution (polydispersity >0.95), with an average particle size of about 200 and 600 nm, respectively. The dispersion of RC3 was a stable clear aqueous solution (no measurable particle size).

Example 1

Synthesis of a BMA/BA Emulsion Polymer in the Presence of Block Copolymer 1

75 gram of demineralized water and 185.6 gram of the aqueous dispersion of block copolymer 1 prepared above (24.3% in water) were added to a 1 L three-necked glass flask equipped with stirrer, condenser cooler and temperature measuring probe. The reaction mixture was heated while stirring to 65° C. under nitrogen atmosphere. Then a mixture of 35.3 gram BMA and 9.8 gram BA was added. After 20 minutes mixing at 65° C. an initiator mixture of 0.2 gram APS and 20 gram demineralized water, set at pH=8 with triethylamine, was added. The reaction mixture was then heated to 85° C. After 10 minutes at 85° C. the gradual addition was started of an initiator feed mixture of 0.2 gram APS and 18 gram demineralized water (set at pH=8 with triethylamine), and a pre-emulsified monomer feed mixture of 55 gram demineralized water, 0.2 gram SLS (30 wt % in water), 65.6 gram BMA and 18.2 gram BA. Both mixtures were added as parallel feeds to the reaction mixture over a time period of 2.5 hours. During the reaction the pH of the reaction mixture was kept above 7.0. At the end of the monomer and initiator feed the reaction mixture was kept for 30 minutes at 85° C. A post reaction with tert-butyl hydroperoxide and isoascorbic acid was performed to react any residual monomer. The resultant emulsion was then cooled to room temperature and the pH was adjusted with triethylamine to 8.0.

Examples 2 and 3 were prepared using a similar recipe and procedure as applied for Example 1, but now either the amount of block copolymer was varied (Example 2) or the Tg of the emulsion polymer was varied by changing the BMA/BA wt ratio (Example 3).

Example 4 was prepared using a similar recipe and procedure as applied for Example 1, but now the dispersion of block copolymer 2 was applied at a level of 33 wt % on total solids.

Comparative Examples 1a, 1b and 1c

Synthesis of a BMA/BA Emulsion Polymer in the Presence of Random Copolymer RC1, RC2, or RC3

The preparation of the comparative examples 1a, 1b and 1c based on RC1, RC2 and RC3, respectively, was performed using the same recipe and procedure as applied for Example 2, but now the aqueous dispersions of either random copolymer RC1, RC2 or RC3 was applied, each at a level of 16 wt % on total solids.

It was found that Comparative Examples 1a and 1b could not be prepared as the synthesis of the emulsion polymers based on RC1 and RC2 resulted in excessive amounts of fouling and sediment formation. These results demonstrate that the random copolymers RC1 (12 wt % AA) and RC2 (20 wt % AA) exhibit very poor stabilization properties, especially when compared to the respective block copolymers. The synthesis of the emulsion polymer based on RC3 (30 wt % AA), Comparative Example 1c, gave relatively low fouling and sediment formation and resulted in a stable latex that was found to be acceptable for further testing.

Comparative Example 2

Synthesis of a BMA/BA Emulsion Polymer in the Presence of Block Copolymer 3

Comparative Example 2 was prepared using a similar recipe and procedure as applied for Example 3, but now the dispersion of block copolymer 3 was applied at a level of 16 wt % on total solids.

Comparative Example 3

Synthesis of a MMA/BA/iBOA/AA Emulsion Polymer 310 gram of demineralized water and 10.9 gram of SLS (30 wt % in water) were added to a 2 L three-necked glass flask equipped with stirrer, condenser cooler and temperature measuring probe. The reaction mixture was heated while stirring to 75° C. under nitrogen atmosphere. Then 10 wt % was added of a pre-emulsified monomer mixture consisting of in total 165 gram demineralized water, 5.5 gram SLS (30 wt % in water), 176.6 gram MMA, 151.8 gram BA, 56.4 gram iBOA, and 7.7 gram AA. The reaction mixture was further heated to 75° C. and then a mixture of 0.3 gram APS and 5.3 gram demineralized water was added. The reaction mixture was then heated to 85° C. and kept at this temperature for 15 minutes. An initiator feed mixture of 0.69 gram APS and 68.3 gram demineralized water and the remaining 90 wt % of the pre-emulsified monomer feed were then gradually added as parallel feeds to the reaction mixture over a time period of 3 hours. The reaction mixture was then kept for 30 minutes at 85° C. A post reaction with tert-butyl hydroperoxide and isoascorbic acid was performed to react any residual monomer. The resultant emulsion was then cooled to room temperature. The pH of the latex was adjusted to 8.0 by addition of ammonia.

Comparative Example 4

Synthesis of a BMA/BA/iBOA/AA Emulsion Polymer 606 gram of demineralized water and 17.1 gram of SLS (30 wt % in water) were added to a 2 L three-necked glass flask equipped with stirrer, condenser cooler and temperature measuring probe. The reaction mixture was heated while stirring to 80° C. under nitrogen atmosphere. Then 10 wt % was added of a pre-emulsified monomer mixture consisting of in total 179 gram demineralized water, 8.6 gram SLS (30 wt % in water), 336.1 gram BMA, 93.0 gram BA, 76.3 gram iBOA, and 7.9 gram AA. The reaction mixture was further heated to 78° C. and then a mixture of 0.5 gram APS and 4.2 gram demineralized water was added. The reaction mixture was then heated to 85° C. and kept at this temperature for 10 minutes. An initiator feed mixture of 1.1 gram APS and 107 gram demineralized water and the remaining 90 wt % of the pre-emulsified monomer feed were then gradually added as parallel feeds to the reaction mixture over a time period of 2 hours. The reaction mixture was then kept for 30 minutes at 85° C. A post reaction with tert-butyl hydroperoxide and isoascorbic acid was performed to react any residual monomer. The resultant emulsion was then cooled to room temperature. The pH of the latex was adjusted to 8.0 by addition of ammonia.

Comparative Example 5 was prepared using a similar recipe and procedure as applied for Comparative Example 4, but now the monomer feed mixture consisted of in total 132 gram demineralized water, 8.6 gram SLS (30 wt % in water), 270.2 gram BMA, 74.8 gram BA, 152.6 gram iBOA, and 15.7 gram AA.

The properties of the final prepared acrylic dispersions are given in Table 2. All latices, except those of Comparative Examples 1a and 1b, were processed with little or no fouling and/or sediment formation. Final free monomer levels were all well below 500 ppm.

TABLE 2

| Experiment | Solids[1] [%] | pH [—] | Viscosity (Brookfield) [mPa · s] | Particle size (DLS) [nm] | Mn (GPC) [kg/mol] | Mw (GPC) [kg/mol] |
| --- | --- | --- | --- | --- | --- | --- |
| Example 1 | 31.8 | 8.0 | 60 | 66 | 15.5 | 154 |
| Example 2 | 35.1 | 8.2 | 98 | 68 | 23.5 | 173 |
| Example 3 | 33.0 | 7.8 | 50 | 67 | 17.9 | 200 |
| Example 4 | 28.8 | 7.5 | 45 | 118 | 20.5 | 246 |
| Comp Ex 1c | 34.0 | 7.9 | 23 | 428 | 18.6 | 118 |
| Comp Ex 2 | 29.8 | 7.9 | 155 | 71 | 33.4 | 174 |
| Comp Ex 3 | 39.6 | 8.0 | 21 | 99 | 17.2 | 250 |
| Comp Ex 4 | 34.6 | 7.4 | 10 | 92 | 36.6 | 410 |
| Comp Ex 5 | 34.9 | 7.8 | 10 | 471 | 30.1 | 226 |

[1]gravimetrically determined

Examination of Dry and Wet Adhesion Level to ABS, PVC, Polystyrene (PS), Polycarbonate (PC) and Untreated Polypropylene (Untreated PP)

The level of dry and wet adhesion to various plastic substrates was determined using a Gitterschnitt test (see test descriptions). Prior to testing all Examples and Comparative Examples were adjusted to a solids level of about 30% with demineralized water and formulated with 10 wt % butyl glycol and 1 wt % Byk 346, based on total acrylic dispersion. The formulations were allowed to stand overnight prior to use.

Plastic test panels of ABS (Vikureen ABS white, Vink), PVC (PVC XT light grey, Vink), PS (Vikureen PS XT white, Vink), PC (Lexan 9030 Exell D transparent, GE Plastics) and PP (Simona PP XT naturel, Vink) of about 12 cm×20 cm×0.2 cm were cleaned with ethanol and coated with the formulated acrylic dispersions at a 50 μm layer thickness using a wirerod. The coated panels were left to dry for at least 1 hour at approximately 20° C., and then dried in an oven at 50° C. for a period of 16 hours to make sure that all water and residual solvent was removed from the film. After this drying period the coated plastic plates were left for at least one hour at 20° C. The obtained dry films were then examined for dry and wet adhesion (Gitterschnitt, Gt).

Results Adhesion to Untreated Polypropylene Plates

For all Examples and Comparative Examples the level of dry and wet adhesion to untreated polypropylene plates was determined. Results are given in Table 3.

TABLE 3

| Experiment | Dry adhesion to untreated PP plate (Gt; 0 = excellent and 5 = poor) | Wet adhesion to untreated PP plate (Gt; 0 = excellent and 5 = poor) |
| --- | --- | --- |
| Example 1 | 2 | 2 |
| Example 2 | 0-1 | 0-1 |
| Example 3 | 2-3 | 2 |
| Example 4 | 2 | 2 |
| Comp Ex 1c | 5 | 5 |
| Comp Ex 2 | 5 | 5 |

TABLE 3-continued

| Experiment | Dry adhesion to untreated PP plate (Gt; 0 = excellent and 5 = poor) | Wet adhesion to untreated PP plate (Gt; 0 = excellent and 5 = poor) |
|---|---|---|
| Comp Ex 3 | 5 | 5 |
| Comp Ex 4 | 5 | 5 |
| Comp Ex 5 | 5 | 5 |

The results given in Table 3 show that the Examples have much better adhesion to untreated polypropylene than the Comparative Examples.

Results Adhesion to Oriented Polypropylene Foil

For Example 1 and Comparative Example 3 the level of dry adhesion to oriented polypropylene substrate (OPP foil) was determined using a tape test. Prior to testing the acrylic dispersions of Example 1 and Comparative Example 3 were formulated with 10 wt % on total dispersion of butyl glycol (added as 80 wt % in water). Only in case of adhesion testing to the very hydrophobic untreated polypropylene substrate an additional amount of 0.25 wt % on total dispersion of Surfynol PSA-336 (available from Air Products) was added together with the butyl glycol. The pH of the butyl glycol/water premix was adjusted to about 8 by ammonia before addition. The formulations were tinted with Microlith blue to allow visual assessment of the adhesion test results.

Films of the tinted formulated dispersions were applied by a wire rod at 6 microns wet onto the treated and untreated side of an oriented polypropylene substrate foil (50 MB-210 available from Exxon Mobil). The casted films were dried for 1 minute in an oven at 80° C. The obtained dry films were left for at least 2 hours at 20° C. and then examined for adhesion properties by performing a tape test. Prior to application the surface tension of the treated and untreated side of the oriented polypropylene substrate surface was measured as defined in DIN ISO 8296 in accordance with ASTM D 2578-04a by using test inks available from Softal Electronic (Germany).

The test results obtained for Example 1 and Comparative Example 3 are given in Table 4.

TABLE 4

| Experiment | Wetting (0-5; 5 = good) | Tape test (% coating removed) | Locus of failure |
|---|---|---|---|
| | treated oriented polypropylene foil (surface tension 34-36 Dynes/cm) | | |
| Example 1 | 4 | 0% | no failure |
| Comp Ex 3 | 3-4 | 100% | adhesive |
| | untreated oriented polypropylene foil (surface tension << 34 Dynes/cm) | | |
| Example 1 | 5 | <10% | cohesive |
| Comp Ex 3 | 5 | 100% | adhesive |

The results given in Table 4 show that Example 1 provides very good adhesion to both the treated and untreated side of the OPP foil, whereas Comparative Example 3 gives no adhesion at all.

Dry and Wet Adhesion to ABS, Polystyrene (PS), Polyvinyl Chloride (PVC) and Polycarbonate (PC)

For Examples 1 to 5 and Comparative Example 1c the level of dry and wet adhesion to ABS, PS, PVC and PC was determined using the Gitterschnitt test, where 0=excellent adhesion and 5=very poor adhesion. Results are given in Table 5.

TABLE 5

| Experiment | ABS dry/wet (Gt) | PS dry/wet (Gt) | PVC dry/wet (Gt) | PC dry/wet (Gt) |
|---|---|---|---|---|
| Example 1 | 0/1 | 0-1/1 | 0-1/0-1 | 0-1/1 |
| Example 2 | 0/0-1 | 0/0 | 0/0 | 0/0-1 |
| Example 3 | 0/1 | 0/0 | 0/0 | 1/1-2 |
| Example 4 | 1/1 | 0/1 | 0/1 | 0-1/1 |
| Comp Ex 1c | 0/2 | 0/1 | 0-1/5 | 1/4 |

The results given in Table 5 show that the Examples have better overall wet adhesion than Comparative Example 1c.

Test Descriptions

Dry and Wet Adhesion to Plastic Substrate Plates

The level of dry adhesion to untreated plastic substrates (ABS, PVC, polystyrene, polycarbonate, and untreated polypropylene) was determined using a cross-cut test ("Gitterschnitt" (Gt) test in accordance with ASTM D 3002/D 3359 and DIN EN ISO 2409). A cross-cut was made onto the dried coated plastic plates using a cross-cut knife (Byk-5120). A self adhesive tape (Sellotape™ 25 mm from Henkel Consumer Adhesives) was applied under uniform pressure onto the coated substrate, covering the cross-cut, where after the tape was torn off in a single movement. This tape test was then repeated with the tape placed over the cross-cut in a perpendicular direction to the first test. The degree of dry adhesion of the coating onto the plastic substrate was then classified with a scale from 0 to 5 (according ISO Class 0-5 (Gt)) by determining the amount of coating that is detached or flaked partly or wholly along the edges of the cuts, where 0 means that the cross-cut area is not affected (excellent adhesion); 1 means that the affected cross-cut area is not significantly greater than 5%; 2 means that the affected cross-cut area is significantly greater than 5%, but not significantly greater than 15%; 3 means that the affected cross-cut area is significantly greater than 15%, but not significantly greater than 35%; 4 means that the affected cross-cut area is significantly greater than 35%, but not significantly greater than 65%; 5 means any degree of flaking that cannot even be classified by classification 4 (very poor adhesion).

To determine the level of wet adhesion a piece of cotton wool soaked with demineralized water was placed on an area of the coated substrate. After 4 hours at 20 (±3° C.) the wet cotton wool was removed and the coating was carefully dried with a tissue. The level of wet adhesion was then determined according the cross-cut test method used for determining the dry adhesion, where the cross-cut was made onto the coated area that was exposed to the water.

Adhesion to Oriented Polypropylene Foil

A self adhesive tape (Sellotape™ 25 mm from Henkel Consumer Adhesives) was applied under uniform pressure onto a dry coating layer applied onto both the treated and untreated side of the oriented polypropylene substrate, where after the tape is torn off with a non-continuous movement. The adhesion properties of the coating onto the polypropylene substrate were investigated by assessing the amount of coating that is adhered to the tape after removing the tape from the coating. Optimal adhesion is obtained at "0% coating removed". In addition the main locus of failure was visually determined as being cohesive, i.e. failure within the coating, or adhesive, i.e. between the coating-substrate interface. Cohesive failure typically indicates a strong interaction between the coating and the substrate, whereas adhesive failure means a weak interaction between the coating and the substrate.

Wetting

The wetting behavior of the coating onto both the treated and untreated side of the oriented polypropylene substrate surface was visually assessed and classified from a scale of 0 to 5, where 0 means very poor wetting and 5 means excellent wetting.

The invention claimed is:

1. A process for preparing an aqueous coating composition to coat polyolefinic substrates, the coating composition comprising a block copolymer and a polymer P; wherein the block copolymer comprises at least blocks $[A]_x[B]_y$, wherein the process comprises obtaining at least block [A] by controlled radical polymerisation via a reversible addition-fragmentation chain transfer (RAFT) mechanism of at least one ethylenically unsaturated monomer;

wherein block [A] comprises:
i) 0 to 50 mol % of ethylenically unsaturated monomer units bearing crosslinking functional groups;
ii) 20 to 100 mol % of ethylenically unsaturated monomer units bearing water-dispersing functional groups;
iii) 0 to 50 mol % of ethylenically unsaturated monomers units selected from linear or branched $C_1$ to $C_8$ alkyl (meth)acrylate monomers;
iv) 0 to 5 mol % of ethylenically unsaturated monomer units bearing plastic adhesion promoting functional groups; and
v) 0 to 10 mol % of ethylenically unsaturated monomers units different from those from i), ii), iii)+iv);
where i), ii), iii), iv)+v) add up to 100%;
block [A] has an average degree of polymerisation x, where x is an integer from 3 to 80; and
wherein block [B] comprises:
i) 0 to 5 mol % of ethylenically unsaturated monomer units bearing crosslinking functional groups;
ii) 0 to 15 mol % of ethylenically unsaturated monomer units bearing water-dispersing functional groups;
iii) 0 to 50 mol % of ethylenically unsaturated monomers units selected from linear or branched $C_1$ to $C_8$ alkyl (meth)acrylate monomers;
iv) 20 to 100 mol % of ethylenically unsaturated monomer units bearing plastic adhesion promoting functional groups; and
v) 0 to 10 mol % of ethylenically unsaturated monomers units different from those from i), ii), iii)+iv);
where i), ii), iii), iv)+v) add up to 100%;
block [B] has an average degree of polymerisation y, where y is an integer >10, where y>x; and
wherein the process further comprises obtaining the polymer P by conducting, in the presence of the block copolymer, emulsion polymerisation of emulsion polymerization monomers, wherein polymer P comprises:
i) 0 to 20 wt % of ethylenically unsaturated monomer units bearing crosslinking functional groups;
ii) 0 to 15 wt % of ethylenically unsaturated monomer units bearing water-dispersing functional groups;
iii) 50 to 100 wt % of ethylenically unsaturated monomers units selected from linear or branched $C_1$ to $C_8$ alkyl (meth)acrylate monomers;
iv) 0 to 50 wt % of ethylenically unsaturated monomer units bearing plastic adhesion promoting functional groups; and
v) 0 to 10 wt % of ethylenically unsaturated monomers units different from those from i), ii), iii)+iv);
where i), ii), iii), iv)+v) add up to 100% and
wherein at least 20 wt % of polymer P is covalently bonded to the block copolymer, and
wherein component iv) of Block [B] comprises at least 50 mol % of isobornyl (meth)acrylate.

2. The process according to claim 1, wherein block [A] is a controlled radical polymerisation product of at least one ethylenically unsaturated monomer via a reversible addition-fragmentation chain transfer mechanism in solution in the presence of a control agent and a source of free radicals.

3. The process according to claim 1, wherein block [B] is a controlled radical polymerisation product of at least one ethylenically unsaturated monomer via a reversible addition-fragmentation chain transfer mechanism in solution in the presence of a control agent and a source of free radicals.

4. The process according to claim 1, wherein the ethylenically unsaturated monomer units bearing plastic adhesion promoting functional groups are selected from the group consisting of $C_6$ to $C_{20}$ optionally substituted alkyl, cyclo alkyl and or aryl (meth)acrylate monomers, styrenic monomers, $C_6$ to $C_{20}$ optionally substituted alkyl(meth)acrylamide monomers, vinylic monomers and mixtures thereof.

5. The process according to claim 1, wherein the control agent is selected from the group consisting of dithioesters, thioethers-thiones, trithiocarbonates, dithiocarbamates, xanthates and mixtures thereof.

6. An aqueous coating composition to coat polyolefinic substrates, the aqueous coating composition comprising a block copolymer and a polymer P; wherein the block copolymer comprises at least blocks $[A]_x[B]_y$, wherein at least block [A] is a controlled radical polymerisation product obtained via a reversible addition-fragmentation chain transfer (RAFT) mechanism of at least one ethylenically unsaturated monomer;

wherein block [A] comprises:
i) 0 to 50 mol % of ethylenically unsaturated monomer units bearing crosslinking functional groups;
ii) 20 to 100 mol % of ethylenically unsaturated monomer units bearing water-dispersing functional groups;
iii) 0 to 50 mol % of ethylenically unsaturated monomers units selected from linear or branched $C_1$ to $C_8$ alkyl (meth)acrylate monomers;
iv) 0 to 5 mol % of ethylenically unsaturated monomer units bearing plastic adhesion promoting functional groups; and
v) 0 to 10 mol % of ethylenically unsaturated monomers units different from those from i), ii), iii)+iv);
where i), ii), iii), iv)+v) add up to 100%;
block [A] has an average degree of polymerisation x, where x is an integer from 3 to 80; and
wherein block [B] comprises:
i) 0 to 5 mol % of ethylenically unsaturated monomer units bearing crosslinking functional groups;
ii) 0 to 15 mol % of ethylenically unsaturated monomer units bearing water-dispersing functional groups;
iii) 0 to 50 mol % of ethylenically unsaturated monomers units selected from linear or branched $C_1$ to $C_8$ alkyl (meth)acrylate monomers;
iv) 20 to 100 mol % of ethylenically unsaturated monomer units bearing plastic adhesion promoting functional groups; and
v) 0 to 10 mol % of ethylenically unsaturated monomers units different from those from i), ii), iii)+iv);
where i), ii), iii), iv)+v) add up to 100%;
block [B] has an average degree of polymerisation y, where y is an integer >10, where y>x; and
wherein the polymer P is an emulsion polymerization product obtained in the presence of the block copolymer which comprises:

i) 0 to 20 wt % of ethylenically unsaturated monomer units bearing crosslinking functional groups;
ii) 0 to 15 wt % of ethylenically unsaturated monomer units bearing water-dispersing functional groups;
iii) 50 to 100 wt % of ethylenically unsaturated monomers units selected from linear or branched $C_1$ to $C_8$ alkyl (meth)acrylate monomers;
iv) 0 to 50 wt % of ethylenically unsaturated monomer units bearing plastic adhesion promoting functional groups; and
v) 0 to 10 mol % of ethylenically unsaturated monomers units different from those from i), ii), iii)+iv);
where i), ii), iii), iv)+v) add up to 100%, and
wherein at least 20 wt % of polymer P is covalently bonded to the block copolymer, and
wherein component iv) of Block [B] comprises at least 50 mol % of isobornyl (meth)acrylate.

7. The coating composition according to claim 6, wherein block [A] is a controlled radical polymerisation product of at least one ethylenically unsaturated monomer via a reversible addition-fragmentation chain transfer mechanism in solution in the presence of a control agent and a source of free radicals.

8. The coating composition according to claim 6, wherein block [B] is controlled radical polymerisation product of at least one ethylenically unsaturated monomer via a reversible addition-fragmentation chain transfer mechanism in solution in the presence of a control agent and a source of free radicals.

9. The coating composition according to claim 6, wherein the ethylenically unsaturated monomer units bearing plastic adhesion promoting functional groups are selected from the group consisting of $C_6$ to $C_{20}$ optionally substituted alkyl, cyclo alkyl and or aryl (meth)acrylate monomers, styrenic monomers, $C_6$ to $C_{20}$ optionally substituted alkyl(meth)acrylamide monomers, vinylic monomers and mixtures thereof.

10. The coating composition according to claim 6, wherein the control agent is selected from the group consisting of dithioesters, thioethers-thiones, trithiocarbonates, dithiocarbamates, xanthates and mixtures thereof.

11. The coating composition according to claim 6, wherein polymer P is at least partially grafted to blocks [A][B].

* * * * *